(12) United States Patent
Tiwari

(10) Patent No.: US 11,632,408 B1
(45) Date of Patent: Apr. 18, 2023

(54) INTELLIGENT, DYNAMIC, SECURE, REAL-TIME, SYMMETRICAL DATA STREAMING APPARATUS LEVERAGING QUANTUM COMPUTING

(71) Applicant: Bank of America Corporation, Charlotte, NC (US)

(72) Inventor: Sonali Tiwari, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/671,677

(22) Filed: Feb. 15, 2022

(51) Int. Cl.
*H04L 65/61* (2022.01)
*G06N 10/20* (2022.01)
*G06F 7/58* (2006.01)

(52) U.S. Cl.
CPC .............. *H04L 65/61* (2022.05); *G06F 7/588* (2013.01); *G06N 10/20* (2022.01)

(58) Field of Classification Search
CPC .......... H04L 65/61; G06N 10/20; G06F 7/588
USPC ........................................................ 709/231
See application file for complete search history.

(56) References Cited

U.S. PATENT DOCUMENTS 8,095,678 B2 * 1/2012 Worrall .................... G06F 3/067 707/828
2013/0101068 A1 * 4/2013 Mombers ............ H04N 21/4305 375/316

FOREIGN PATENT DOCUMENTS

BR 112012003688 B1 * 3/2021 ......... H03M 13/3761

OTHER PUBLICATIONS

Xiongfeng Ma et al., "Postprocessing for Quantum Random-Number Generators: Entropy Evaluation and Randomness Extraction," https://arxiv.org/abs/1207.1473, Jul. 2012.
Kardi Teknomo, "KNN Numerical Example (hand computation)", https://people.revoledu.com/kardi/tutorial/KNN/KNN_Numerical-example.html, Retrieved on Jan. 13, 2022.
M. Stipcevic, "Quantum Random Number Generators and Their Use in Cryptography," https://arxiv.org/ftp/arxiv/papers/1103/1103.4381.pdf, Retrieved on Jan. 13, 2022.

* cited by examiner

Primary Examiner — Glenford J Madamba
(74) Attorney, Agent, or Firm — Weiss & Arons LLP

(57) ABSTRACT

A system for dynamic, secure, real-time, data streaming leveraging quantum computing is provided. The system may include a receiver and router, a plurality of short-term servers, a mid-term database, a k-nearest neighbor number identifier and a quantum random number generator. The receiver and router may receive a request to stream a data element from a source location to an end location. The receiver and router may retrieve the requested data element from one of the short-term servers, the mid-term database and/or the source location. Once the data element is retrieved, the data element may be indexed by the k-nearest neighbor number identifier. The quantum random number generator may tag the data element with a quantum-resilient random number. Based on the random number, a short-term server may be selected. The data element may be forwarded to the selected short-term servers. The short-term storage may stream the data element to the end location.

20 Claims, 8 Drawing Sheets

INTELLIGENT, DYNAMIC, SECURE, REAL-TIME, SYMMETRICAL DATA STREAMING APPARATUS LEVERAGING QUANTUM COMPUTING

FIELD OF TECHNOLOGY

Aspects of the disclosure relate to data streaming environments.

BACKGROUND OF THE DISCLOSURE

Data streaming environments involve receiving streams of large quantities of data elements at data file systems or database file systems. Examples of data file systems or database file systems may include Hadoop®, Kafka®, Oracle® etc.

There exist challenges in data streaming environments. One set of challenges may occur during real-time streaming of the data elements. The receiving system may not be able to control which data elements arrive at the system, when the data elements arrive at the system, the order in which the data elements arrive at the system and the format in which the data element arrive at the system.

Another challenge may be the size of the data element being streamed as compared to size of the system.

Yet another challenge may be the order in which the data arrives. The order of the data elements may be haphazard or erratic. For example, a January 10th file may arrive first, while January 1st file may arrive second.

Still another challenge may include the format in which the data arrives. The system may not be informed of the format in which the data will arrive, and the data may be received in various formats.

Therefore, it would be desirable to create an intelligent platform that manages data streaming requests. It would be preferable for the intelligent platform to receive the requests, retrieve the indicated data, store the data in an organized manner and forward the data to the requestor.

SUMMARY OF THE DISCLOSURE

Apparatus and methods for dynamic, secure, real-time symmetrical data streaming leveraging quantum computing are provided.

A requestor may transmit a request to stream a data element. The request may be received at a streaming location. The request may include details of the data element. The request may include metadata relating to the data element. The metadata may include a source location. The source location may be a memory location from where the data can be retrieved.

Methods may include identifying, whether or not the requested data is available within the streaming location. When the requested data is available within the streaming location, methods may include streaming the data from the streaming location to a location specified by the requestor.

When the requested data element is not available within the streaming location, the data element may be streamed from a source location to the streaming location. The details of the source location may be identified within the metadata of the data element. The source location may be a different location from the streaming location.

The data element may be forwarded to an identification and routing location within the streaming location. A copy of the data element may be forwarded from the identification and routing location to a schema-agnostic, horizontally-scalable database for storage. The database may be located within the streaming location. The database may be a NoSQL (No Structured Query Language) database.

There may be a container that communicates between the identification and routing location and the database. The container may store a set of identifying details relating to the data element.

Concurrent to the forwarding the copy of the data element from the identification and routing location to the database, the data element may also be forwarded to a K-nearest neighbor ("KNN") calculation location. The KNN calculation location may be located within the streaming location.

The KNN calculation location may determine a K-value for the data element. The K-value may identify the data element. The K-value may be maintained at a K-value history component.

Upon determination of the K-value for the data element, the data element may be forwarded to a quantum random number generation location. The quantum random number generation location may be located within the streaming location.

A quantum random number generation algorithm may be executed on the data element at the quantum random number generation location. The algorithm may generate a quantum-resilient random number. The quantum-resilient random number may uniquely identify the data element with respect to other data elements stored in a group of servers.

The data element and the quantum-resilient random number may be forwarded to data distribution location. The data distribution location may be located within the streaming location. At the data distribution location, a server that is compatible with the data element may be identified and/or selected. The server may be included in a group of servers.

In one embodiment, the server may be selected based on the quantum-resilient number associated with the data element. Each server included in the group of servers may be associated with a subrange of numbers included in a predetermined range of numbers. The quantum-resilient random number may be selected from the predetermined range of numbers. The data distribution location may determine in which subrange of numbers the quantum-resilient random number is included. The data distribution location may then select the server that is associated with the subrange of numbers that includes the quantum-resilient random number. Because data elements are distributed based on a generated quantum-resilient random number, and a new quantum-resilient random number may be generated for each data element, the data distribution location may distribute received data elements evenly to the group of servers.

The data distribution location may forward the data element and the quantum-resilient random number to the identified server. The data element may be received at the identified server. The data element may be streamed from the identified server to the requestor and/or a location specified by the requestor.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
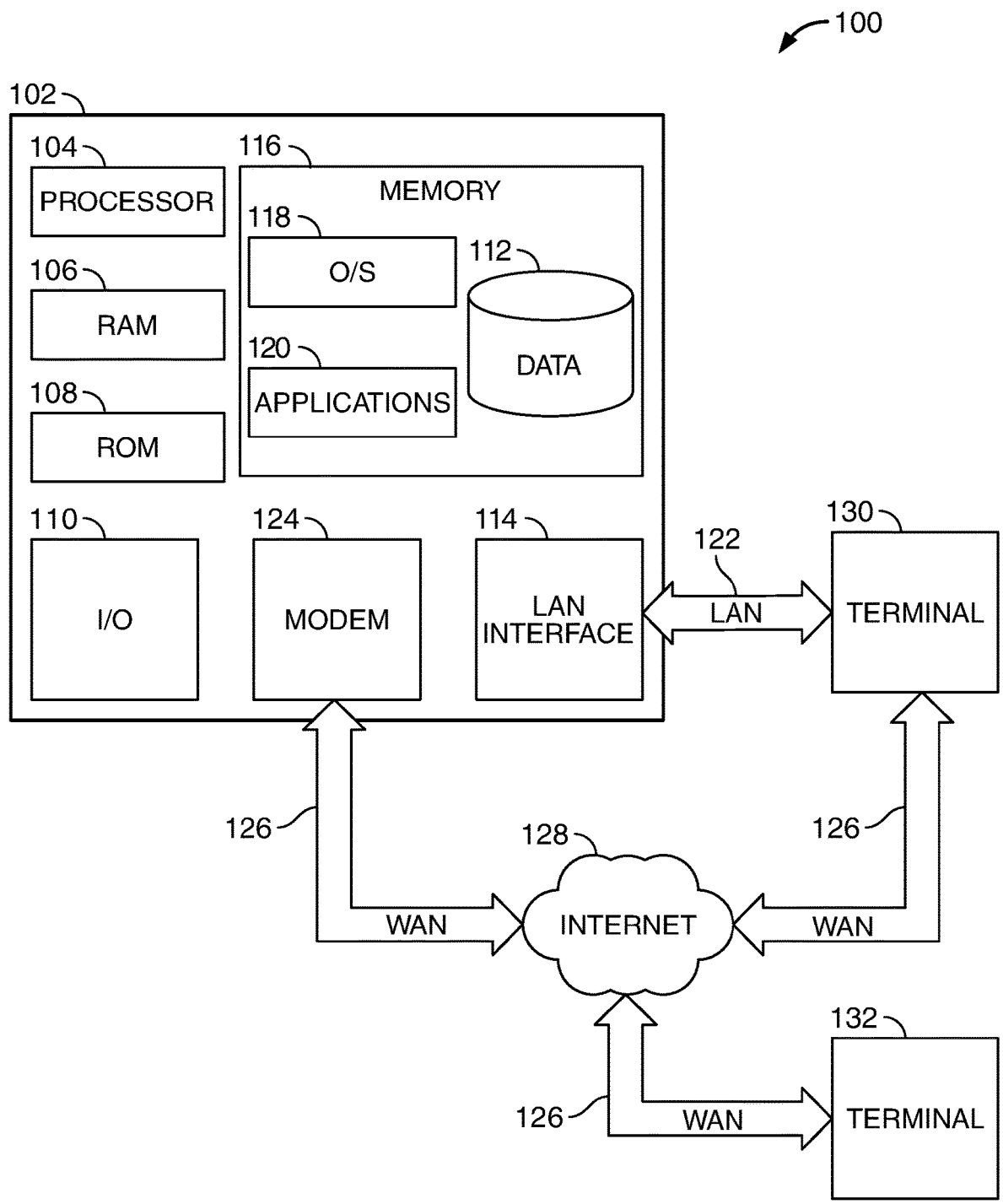
FIG. 1 shows an illustrative diagram in accordance with principles of the disclosure.

Apparatus, systems and methods for dynamic, secure, real-time, symmetrical data streaming leveraging quantum computing is provided.

The system may include an initial identifier and router. The initial identifier and router may receive one or more data streaming requests. The one or more data streaming requests may be received from a plurality of users. The initial identifier and router may execute the one or more data streaming requests. The execution of the one or more data streaming requests may include retrieval of one or more data elements, included in the one or more data streaming requests, from one or more source locations.

The initial identifier and router may also forward a plurality of streamed data elements, identified in the one or more data streaming requests, to one or more storage locations for future retrieval.

The system may also include a mid-term storage database. The mid-term storage database may store a copy of the streamed data elements for a first predetermined time period. The first predetermined time period may be twenty-four hours, thirty-six hours, seventy-two hours, one week, one month or any other suitable time period. It should be noted that the time period may limit the amount of data elements stored in the mid-term storage database. Because the mid-term storage database may not be intended to replicate a long-term storage location, after the predetermined time period has lapsed, the data element may be deleted from the mid-term storage database.

The system may also include a first communication element. The first communication element communicates between the mid-term storage database and the initial identifier and router. The first communication element may maintain an index of the copy of the streamed data elements stored in the mid-term storage database.

The system may also include a k-nearest neighbor number identification component. The k-nearest neighbor number identification component may receive the streamed data elements from the initial identifier and router. The k-nearest neighbor number identification component may also identify a k-value for each streamed data element.

K-nearest neighbor number identification, also referred to as KNN, may be an artificial intelligence algorithm for identifying an unknown data element. The premise of the algorithm may include identifying data points that are similar to the unknown data element. The unknown data point is classified based on the similar known data points or known neighbors. After identifying a circle of data points, the unknown data element is classified according to the majority of the data points included in the circle of data points.

It is to be noted that, an important element in a KNN calculation is the determination of the size of the circle of neighbors. Depending on the size of the circle, various classified data points may be captured and therefore may influence, or change, the classification of the unknown data point. The size of the circle may be identified as the k-value. A k-value may be the length from the unknown data point to other data points.

In date time values, a k-value may be a month or year, depending on the entry. As such, an unknown entry, or data point, may be identified as part of a January group because the entry is most similar to January entries. In some embodiments, the k-value, such as the January title may be appended to the entry, or data point, being classified.

The system may also include a second communication element. The second communication element communicates between the k-nearest neighbor number identification component and the initial identifier and router. The second communication element may maintain a second index of the streamed data elements included in a group of servers. The index may be based on the k-value.

The system may also include a quantum random number generation component. The quantum random number generation component may receive the streamed data elements from the k-nearest neighbor number identification component.

The system may also include a quantum random number generation component. The quantum random number generation component may generate a quantum-resilient random number for each data element included in the plurality of streamed data elements. The quantum random number generation component may tag each data element with the generated quantum-resilient random number. The quantum random number generation component may forward each of the plurality of streamed data elements, tagged with the quantum-resilient random number, to a data distribution processor.

The data distribution processor may distribute the steamed data elements to a short-term storage server. The short-term storage server may be included in a group of servers. The short-term storage server may store the streamed data elements for a second predetermined time period. The short-term server may stream the data element to the plurality of users.

In some embodiments, the first predetermined time period may be longer than the second predetermined time period. In an exemplary embodiment, the first predetermined time period may be twenty-four hours while the second predetermined time period may be twenty minutes.

The mid-term storage database may delete the copy of the streamed data elements after a lapse of the first predetermined time period. The short-term server may delete the stored streamed data elements after a lapse of the second predetermined time period.

In some embodiments, prior to the execution of the one or more data streaming requests, the initial identifier and router may identify that the short-term storage server includes a requested data element, identified in the one or more streaming requests. The identification may be via the second communication element. The initial identifier and router may stream the requested data element from the short-term storage server to one of the plurality of users.

In certain embodiments, prior to the execution of the one or more data streaming requests, the initial identifier and router may identify that the short-term storage server does not include a requested data element identified in the one or more data streaming requests. The identification may be via the second communication element. The initial identifier and router may identify that the requested data element is included in the mid-term storage database. The identification may be via the first communication element.

Upon identification that the requested data element is included in the mid-term storage database, the initial identifier and router may retrieve the requested data element from the mid-term storage database. The initial identifier and router may forward the requested data element to the k-nearest neighbor number identification component.

The k-nearest neighbor number identification component may identify a k-value for the requested data element. The quantum random number generation component may receive the requested data element from the k-nearest neighbor number identification component. The quantum random number generation component may receive the requested data element from the k-nearest neighbor number identification component. The quantum random number generation component may generate a second quantum-resilient random number for the requested data element. The quantum random number generation component may tag the requested data element with the second quantum-resilient random number. The quantum random number generation component may forward the requested data element, tagged with the second quantum-resilient random number, to the data distribution processor.

The data distribution processor may distribute the requested data element to the short-term storage server included in the group of servers. The short-term storage server may be selected from the group of servers based on the second quantum-resilient random number. The short-term storage server may store the requested data element for a third-predetermined time period. The third predetermined time period may be twenty minutes, or any other suitable time period. The short-term storage server may also stream the requested data element to one or more users or requestors.

The data distribution processor may distribute each data element, included in the plurality of streamed data elements, to a server included in the group of servers. One or more data elements may be assigned to the short-term server. The distribution may be based on the generated quantum-resilient random number. The short-term storage server may be assigned a predetermined range of numbers and the quantum-resilient random number may be included within the predetermined range of numbers.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 102. Computer 102 may alternatively be referred to herein as an "engine," "server" or a "computing device." Computer 102 may be a workstation, desktop, laptop, tablet, smartphone, or any other suitable computing device. Elements of system 100, including computer 102, may be used to implement various aspects of the systems and methods disclosed herein.

Computer 102 may have a processor 104 for controlling the operation of the device and its associated components, and may include RAM 106, ROM 108, input/output circuit 110, and a non-transitory or non-volatile memory 116. Machine-readable memory may be configured to store information in machine-readable data structures. The processor 104 may also execute all software running on the computer. Other components commonly used for computers, such as EEPROM or Flash memory or any other suitable components, may also be part of the computer 102.

The memory 116 may be comprised of any suitable permanent storage technology—e.g., a hard drive. The memory 116 may store software including the operating system 118 and application(s) 120 along with any data 112 needed for the operation of the system 100. Memory 116 may also store videos, text, and/or audio assistance files. The data stored in Memory 116 may also be stored in cache memory, or any other suitable memory.

Input/output ("I/O") module 110 may include connectivity to a microphone, keyboard, touch screen, mouse, and/or stylus through which input may be provided into computer 102. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 114. System 100 may operate in a networked environment supporting connections to one or more remote computers, such as terminals 130 and 132. Terminals 130 and 132 may be personal computers or servers that include many or all of the elements described above relative to system 100. The network connections depicted in FIG. 1 include a local area network (LAN) 122 and a wide area network (WAN) 126 but may also include other networks. When used in a LAN networking environment, computer 102 is connected to LAN 122 through a LAN interface 114 or an adapter. When used in a WAN networking environment, computer 102 may include a modem 124 or other means for establishing communications over WAN 126, such as Internet 128.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 120, which may be used by computer 102, may include computer executable instructions for invoking functionality related to communication, such as e-mail, Short Message Service (SMS), and voice input and speech recognition applications. Application program(s) 120 (which may be alternatively referred to herein as "plugins," "applications," or "apps") may include computer executable instructions for invoking functionality related to performing various tasks. Application programs 120 may utilize one or more algorithms that process received executable instructions, perform power management routines or other suitable tasks. Application programs 120 may utilize one or more decisioning processes for the processing of calls received from calling sources as detailed herein.

Application program(s) 120 may include computer executable instructions (alternatively referred to as "programs"). The computer executable instructions may be embodied in hardware or firmware (not shown). The computer 102 may execute the instructions embodied by the application program(s) 120 to perform various functions.

Application program(s) 120 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 112, and any other suitable information, may be stored in memory 116.

The invention may be described in the context of computer-executable instructions, such as applications 120, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 102 and/or terminals 130 and 132 may also include various other components, such as a battery, speaker, and/or antennas (not shown). Components of computer system 102 may be linked by a system bus, wirelessly or by other suitable interconnections. Components of computer system 102 may be present on one or more circuit boards. In some embodiments, the components may be integrated into a single chip. The chip may be silicon-based.

Terminal 130 and/or terminal 132 may be portable devices such as a laptop, cell phone, tablet, smartphone, or any other computing system for receiving, storing, transmitting and/or displaying relevant information. Terminal 130 and/or terminal 132 may be one or more user devices. Terminals 130 and 132 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
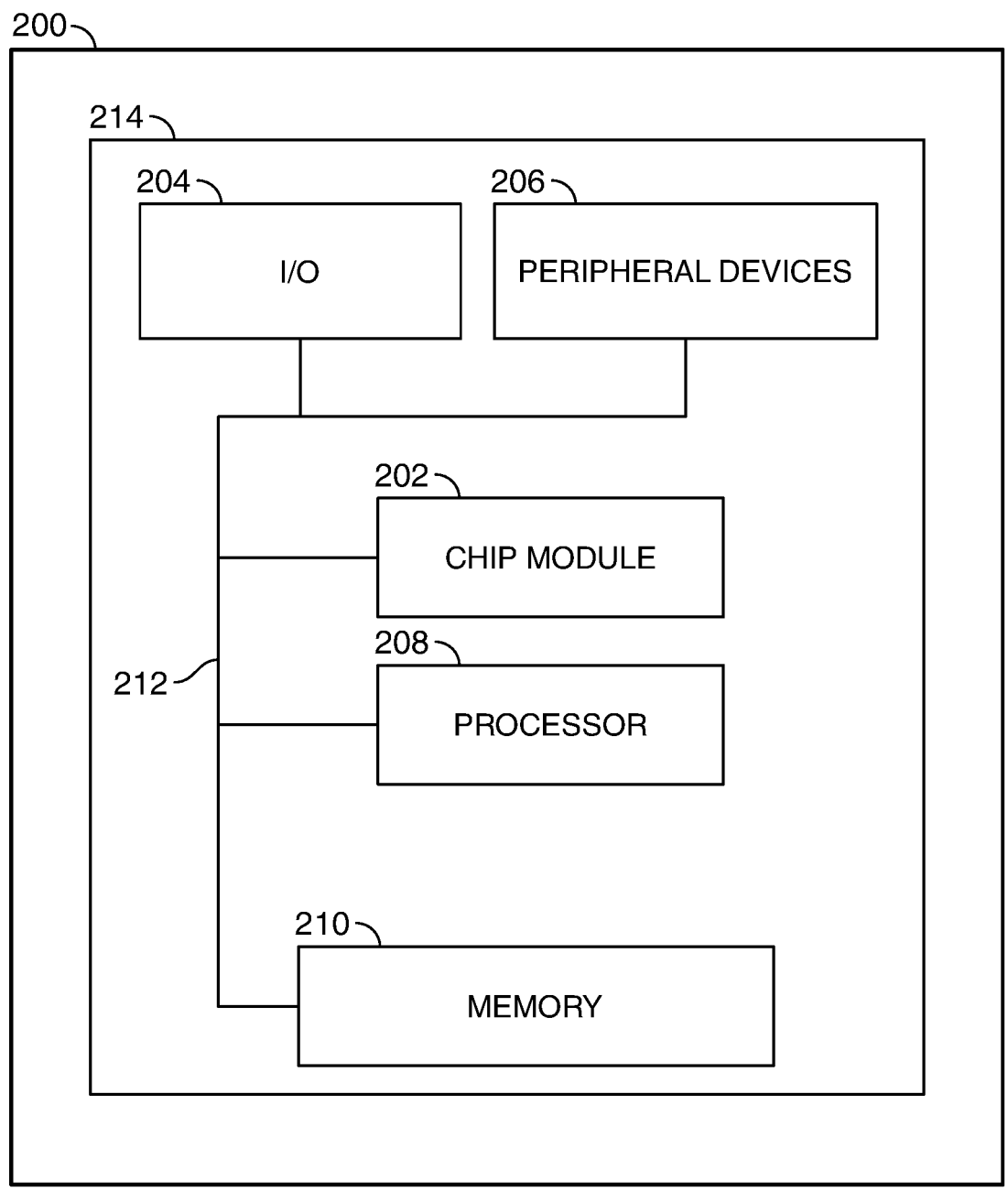
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 120, signals, and/or any other suitable information or data structures.

Components 202, 204, 206, 208 and 210 may be coupled together by a system bus or other interconnections 212 and may be present on one or more circuit boards such as circuit board 214. In some embodiments, the components may be integrated into a single chip. The chip may be silicon-based.

Figure 3:
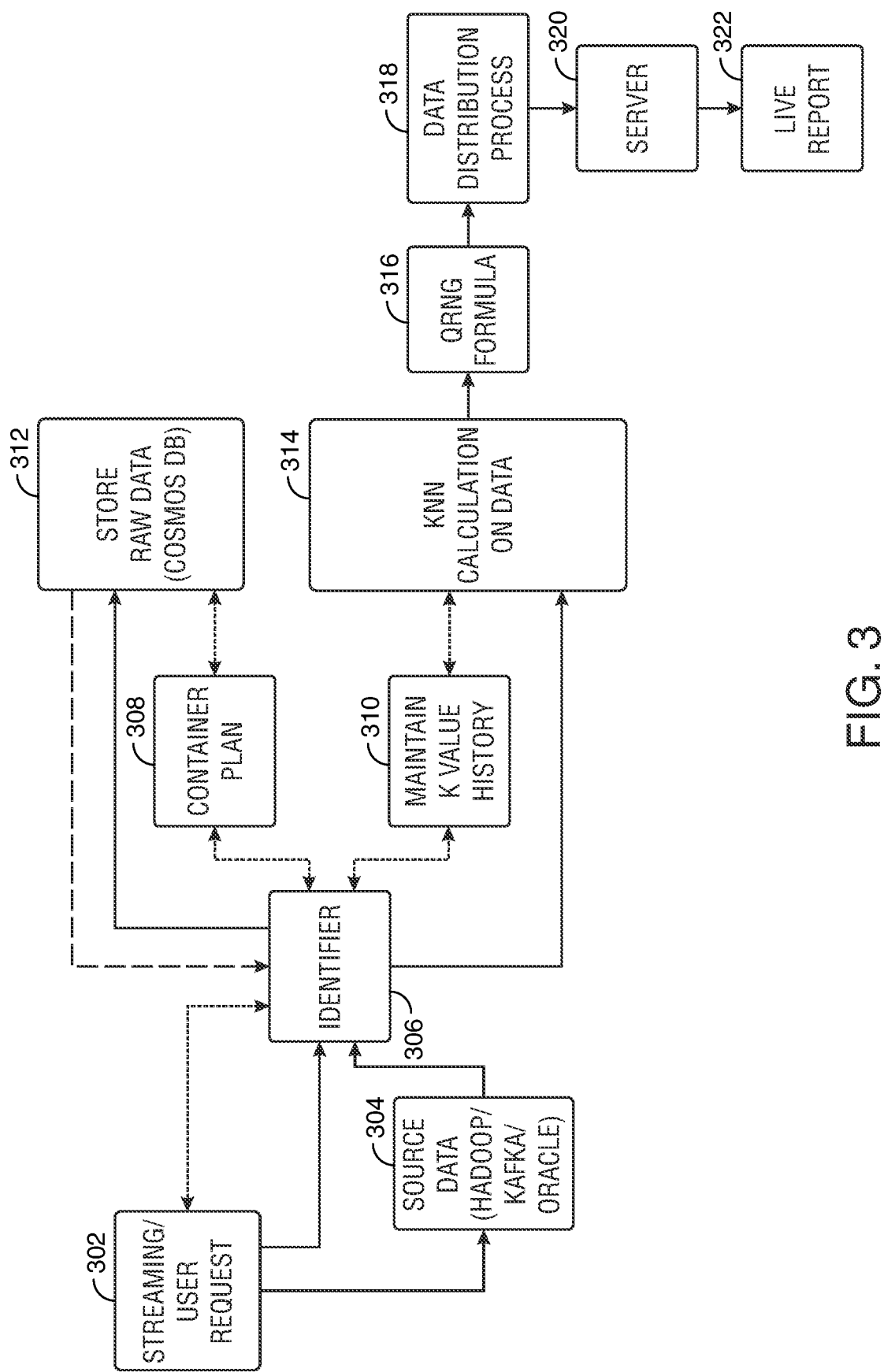
FIG. 3 shows yet another illustrative diagram in accordance with principles of the disclosure.

FIG. 3 shows an illustrative diagram. A user may request streaming of a data element, as shown at 302. The data element may be a computer file, computer folder or any other suitable data element. The location in which the data element is currently located may referred to as source data, as shown at 304. The streaming request may indicate the source location. The source location may be Hadoop®, Kafka®, Oracle® or any other suitable data. It should be appreciated that the data element may be dynamic at the source location. As such, the data element may be continuously updated at the source location. Therefore, it may be desirable that the data being streamed to an end user may be current data. In some embodiments, current data may be understood to mean data that have been stored in a source location within a predetermined time period, such as twenty-four hours.

The streaming request may also indicate a location to which the data element should be streamed. The location to which the data element should be streamed may be referred to as an end location.

There may be an apparatus or module that receives and directs streaming requests from an organization. The apparatus or module may retrieve the data from the source locations and direct the retrieved data to the location which is specified by the user in the request.

The apparatus or module may include various components. A first component may include identifier component 306. The user request may be received at identifier component 306. Identifier component 306 may establish a communication line with source data 304. The communication line between source data 304 and identifier component 306 may be instantiated in the event that the identifier component is not able to access the data at a location internal to the apparatus. Typically, data is available after streaming within the apparatus for twenty-four hours or any other suitable time period after the data has been streamed.

In the event that the data has not yet been streamed, the data element is retrieved from a source location, such as 304, and sent to a schema-agnostic, horizontally scalable database, such as a Cosmos DB®, shown at 312. Container plan 308 may be a communicator between Cosmos DB® and identifier component 308. Container plan 308 may identify which data has been stored at Cosmos DB®. Container plan 308 may serve as an index for the data stored in Cosmos DB®.

Contemporaneously with the transmission of the retrieved data element to Cosmos DB®, the retrieved data element may also be transmitted to KNN calculation on data, shown at 314. KNN calculation on data may execute a K-nearest neighbor algorithm on the data element. The KNN calculation may identify a k-value for the retrieved data element. The k-value may be used to identify the data element. The k-values may be stored in k-value index, such the k-value history shown at 310.

The retrieved data element may be assigned a quantum-resilient random number by a quantum random number generator, or QRNG, shown at 316.

Data distribution process 318 may distribute the data element to a server, such as server 320, based on the quantum-resilient random number. As such, the random number may be used to select a server included in a group of servers. Each server may be assigned a predetermined group of numbers. A server may be selected because it is assigned to the predetermined group of numbers that includes the quantum-resilient random number. A live stream of the data element from server 320 to an end location may be shown at 322.

It should be noted that, in the event that the requested data element has been removed from server 320 and is still stored at Cosmos DB® 312, identifier 306 may retrieve the data from Cosmos DB® 312. Identifier 306 may forward the data element to KNN calculation 314, QRNG 316, data distribution 318 and server 320 for streaming. It should be further noted that container plan 308 and k-value history 310 may be an information source for identifier 306. As such, container plan 308 and k-value history 310 may update identifier 306 as to which data elements are stored in Cosmos DB® 312 and as to which data elements are stored in server 320.

Figure 4:
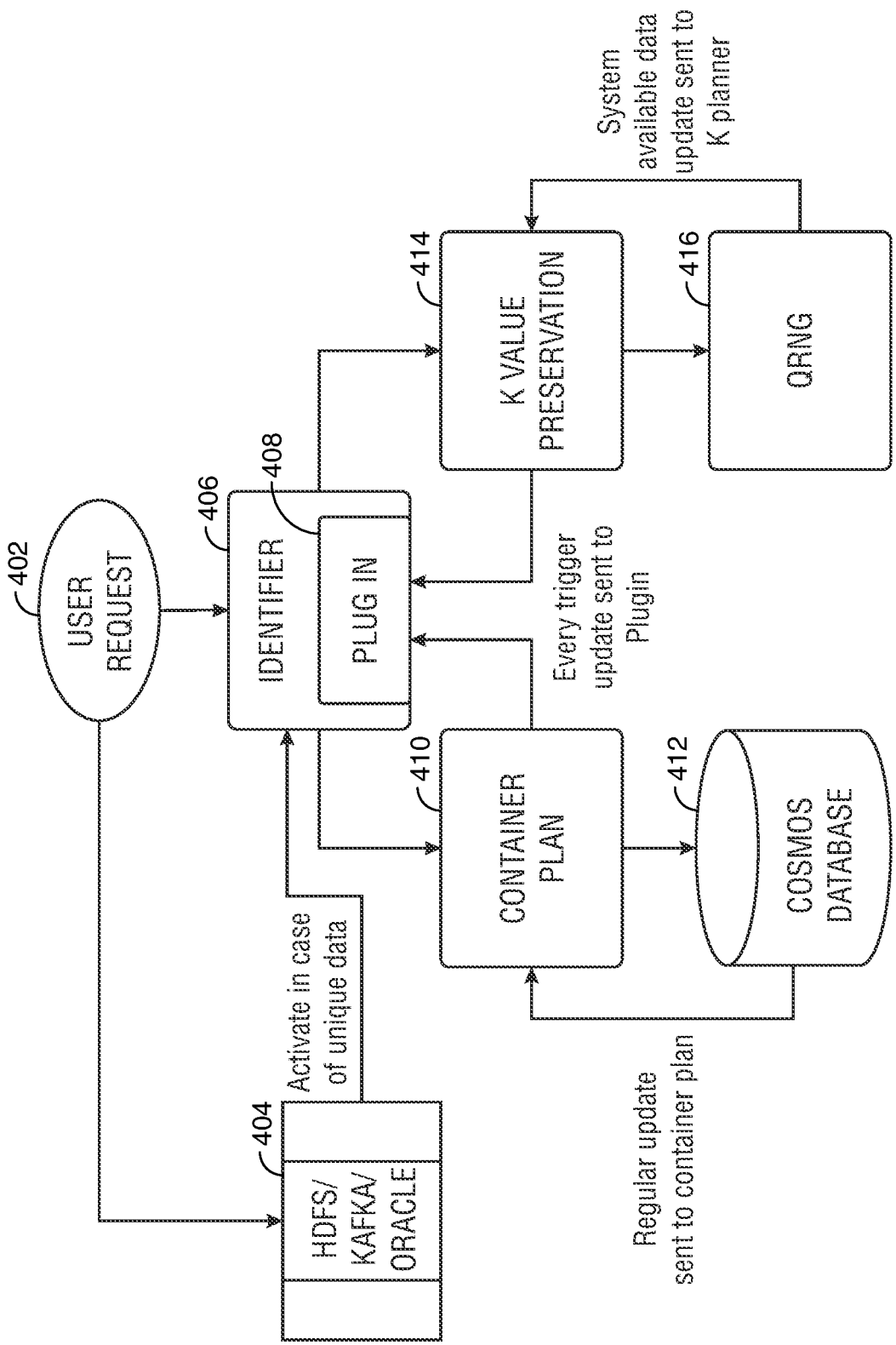
FIG. 4 shows still another illustrative diagram in accordance with principles of the disclosure.

FIG. 4 shows an illustrative diagram. A user may request streaming of a data element. The user request for streaming of the data element may be shown at 402. The request may be received at identifier 406. In some embodiments, the request may also be received a source location 404. Source location 404 may be one or more data sources, such as Hadoop File System (HDFS)®, Kafka®, Oracle®, etc.

Plug in 408 may reside within identifier 406. Plug in 408 may receive updates regarding the contents of both Cosmos database® 412 and a server (not shown) in communication with QRNG 416.

Container plan 410 may receive requests for data from identifier 406. Container plan 410 may continuously receive updates from Cosmos database® 412. As such, container plan 410 may respond to the request for data. The response to the request for data may include the data itself, the location of the data within Cosmos database® 412 and/or information that the data is not currently stored at Cosmos database® 412.

K-value preservation 414 may also receive requests for data from identifier 406. K-value preservation 414 may continuously receive updates from the server via QRNG 416. K-value preservation 414 may respond to the request for data. The response to the request may include the data itself, the location of the data within the server and/or information that the data is not currently stored at the server.

Identifier 406 may activate a communication with a source location, such as 404. Such a communication may be activated in the event that the data is not available at either Cosmos database® 412 or the server.

Figure 5:
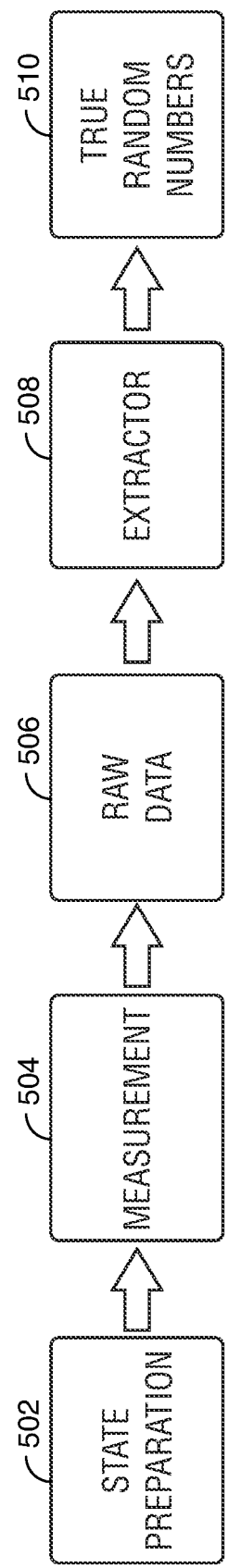
FIG. 5 shows yet another illustrative diagram in accordance with principles of the disclosure.

FIG. 5 shows an illustrative diagram. The illustrative diagram shows a quantum random number generator. An illustrative quantum random number generator may include five steps.

A first step, shown at 502, may include state preparation. State preparation may include the following: The basic setup unit of QRNG is qubit (Quantum bit). A qubit exists in either a zero or one state, which is similar to a binary digit. However, qubit's state may be more than a binary state because a qubit can also be in a zero state and one state at the same time. The condition of being in zero state and a one state at the same time may be referred to as superposition. In one example, in order to create a quantum random number generator, a quantum circuit containing five qubits may be created. The following code shows creating a quantum register with five qubits in a Python® computing language. As such, a qubit may be assigned as followed qr=QuantumRegister(5).

A second step, shown at 504 may include measuring the qubits in superposition states. In a perfect physical environment, such as an environment without quantum noise, with at least a predetermined number of measurements, the qubits may be able to generate a fifty-fifty distribution of zero and one quantum states. In Python® computing language, a measurement setup can be executed using the following code: circuit.measure(qr).

A third step, shown at 506, may include generation of raw data. The raw data may be generated from a practical QRNG using a short random seed. The short random seed may apply an extra source of randomness. Raw data may be similar to classical randomness because of classical noises. The following includes exemplary raw data: '10011', '00000', '11100', '11010' and '11001'.

A fourth step, shown at 508, may include a randomness extractor. Randomness extractors may be used for distilling the true randomness and eliminating the effect of classical noises. The goal of randomness extractors may be to extract perfect randomness from the raw data. The key input parameter of a randomness extractor is the min-entropy (probability) of raw data. After the extraction the output may include the following: '10011':286, '00000':249, '11100':285, '11010':266 and '11010':256.

A fifth step, or final product may be shown at 510. The final product may include true random numbers. The output of extractor may produce random numbers with a high source of entropy using unique properties of quantum physics.

Figure 6:
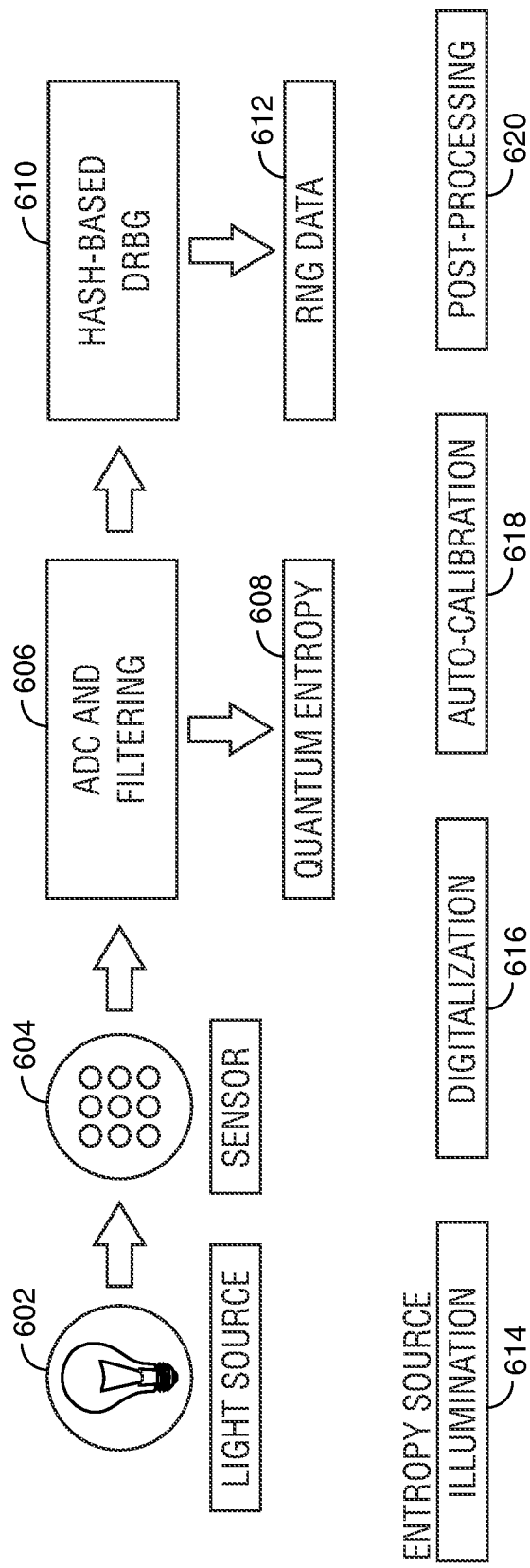
FIG. 6 shows still another illustrative diagram in accordance with principles of the disclosure.

FIG. 6 shows an illustrative diagram. The illustrative diagram illustrates various components of a quantum random number generator. A quantum random number generator may not rely on mathematical algorithms but rather on quantum physics to generate random numbers. A laser-based quantum source, such as light source 602, may generate the randomness in a quantum random number generator.

A qubit can be prepared in the superposition state (zero and one). A measurement aiming at determining whether the system is in the classical state zero or the classical state one may produce a random outcome. According to quantum physics the measurement may be inherently random. As such, the state could not have been known or predicted, independent of the amount of information or computational power available. Furthermore, the result may be perfectly unbiased.

The following may show how an entropy source, such as light, can produce a true random number. This algorithm may be a part of security and trust in cryptographic systems.

The following may describe the entropy source illumination, shown at 614. Quantum random number generation may use light. Each light may include a light-emitting diode (LED). Each LED may randomly emit photons.

The illumination element of the process may include the LED producing photons. The illumination element may also include a transmission element. The transmission element may be the location of the execution of the randomness generation process. The illumination element may also include two single-photon detectors to record the outcomes. Single-photo detectors may be detectors with single-photon resolution.

The following may describe digitalization, shown at 616. The results of the single-photon detectors may be captured on a complementary metal oxide semiconductor (CMOS) image sensor, such as sensor 604. CMOS image sensors may power a significant number of digits.

The following may describe auto-calibration, shown at 618. An analog to digital converter (ADC) and filter, shown at 606, may receive analog readings from the CMOS sensor. The ADC and filter, shown at 606, may filter the analog readings to remove noise. The ADC and filter, shown at 606, may also convert the analog readings into a digital representation of truly randomly-generated zeros and ones, which may be classified as a random string of zeroes and ones with quantum entropy, shown at 608.

The following may describe post-processing, shown at 620. The random bits can be sent directly to, and used by, a requesting application. The random bits can also be sent to one or more Deterministic Random Bit Generators ("DRNG"), shown at 610. The random number generated data (RNG data) may be shown at 612.

Figure 7:
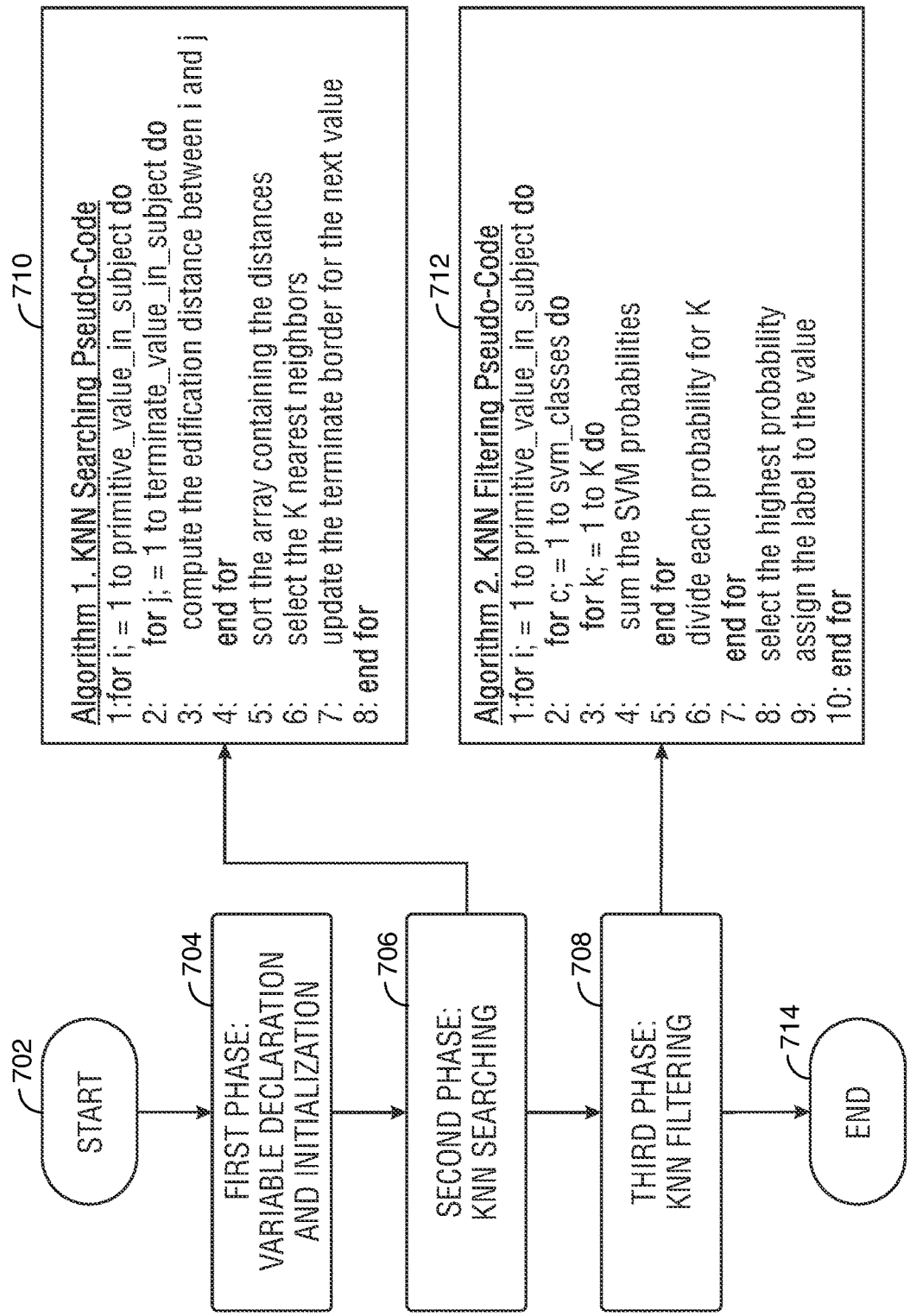
FIG. 7 shows an illustrative flow chart in accordance with principles of the disclosure.

FIG. 7 shows an illustrative flow chart. The illustrative flow chart may execute a KNN calculation for an unclassified data point.

Step 702 shows a start indicator. Step 704 shows a first phase. The first phase may include variable declaration and initialization. Step 706 shows a second phase. The second phase may include KNN searching. Algorithm 1, shown at 710, shows pseudo-code for KNN searching. Algorithm 1 shows identifying the size of the circle of neighbors for the unclassified data point. The size of the circle of neighbors may be referred to as a k-value.

Sep 708 shows a third phase. The third phase may include KNN filtering. Algorithm 2, shown at 712, shows pseudo-code for KNN filtering. KNN filtering includes determining the classification majority of the circle of neighbors. The result of the KNN filtering may be the classification label to assign to the unclassified data point.

It should be appreciated that unclassified data elements, received from a source location, may be processed using a KNN algorithm. Execution of a KNN algorithm may increase the uniqueness of the data within the system and lower the rate of data replication.

KNN algorithms may be a regression-type algorithm. Regression algorithms may solve a problem in which a target holds continuous values or real values. Most regression algorithms have a real number as the output. In an example, a chart can be used to estimate weight of a predefined object given its height.

A KNN algorithm may build upon regression. The KNN algorithm may include identifying a data set, where each data point in the data set is classified. The KNN algorithm may involve adding an unclassified data point to the data set. The KNN algorithm may classify the unclassified data point based on one or more attributes of the unclassified data point. The unclassified data point may be classified by a neighborly vote, where the class of close neighbors is selected.

The following steps illustrate execution of the KNN algorithm:

1. Take a dataset with known categories: In this initial step, collect unsorted, raw data.
2. Cluster the data: Cluster the data based on one or more attributes.
3. Represent a category: Add a cell to indicate an unclassified data element.
4. Find the "k-value": In one example, finding the k-value may involve the following algorithm. The number eight may signify the total amount of data points. In an example that has eight data points, the calculation may be: $\sqrt{(n)} => \sqrt{(8)} => 2.82 => \cong 3$.
5. Locate the "k" nearest neighbors: Locate the values that are most similar to the known attribute and identify the unknown attribute. The number of values located may be defined by the k-value. In the above example, the number of values located may be 3.
6. Classify the new point based on the majority vote of the data set: It should be appreciated that the k-value may continuously change based on a classification by a majority vote of the data set.

Figure 8:
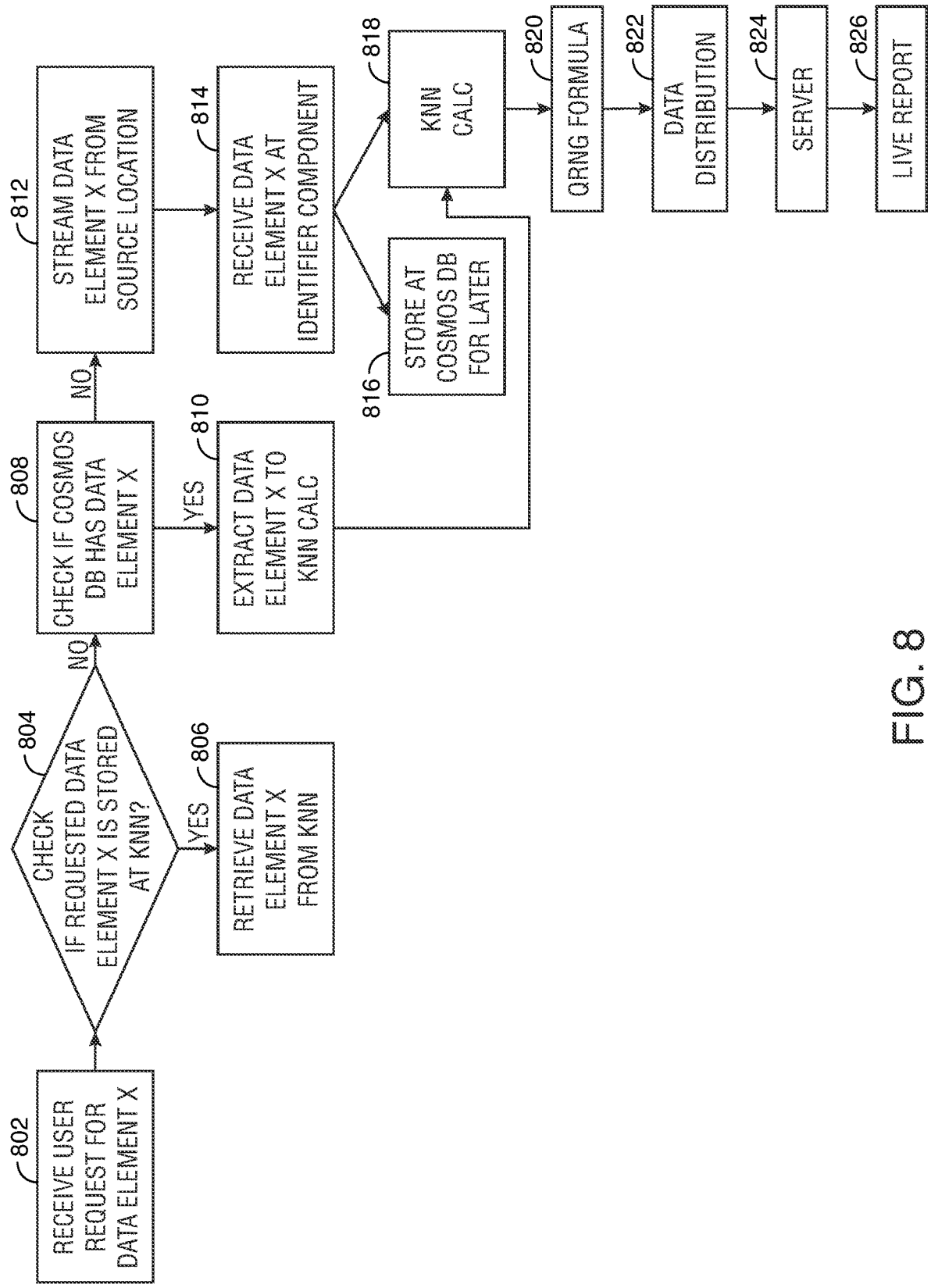
FIG. 8 shows another illustrative flow chart in accordance with principles of the disclosure.

FIG. 8 shows an illustrative flow chart. Step 802 shows receipt of a user request. The user request may be to stream data element X. Query 804 shows checking if the requested data is stored at KNN. Stored at KNN may also be understood to mean, stored at a server in direct, or indirect, communication with KNN. If the requested data is stored at KNN, data element X may be retrieved from KNN, as shown at 806. If the requested data is not available at KNN, the system may check if Cosmos DB® has data element X, as shown at 808.

If data element X is not available at Cosmos DB®, data element X may be streamed from the source location, as shown at 812. Data element X may be received at an identifier component within a streaming system, as shown at 814. The identifier component may store data element X at Cosmos DB® for future retrieval, as shown at 816. The identifier component may also forward data element X to KNN calculation, as shown at 818.

KNN calculation may identify a k-value for data element X. KNN calculation may forward data element X to QRNG formula, shown at 820. In the event that Cosmos DB® stores data element X, data element X may be extracted from Cosmos DB® to KNN calculation, as shown at 810.

QRNG formula 820 may generate a quantum-resilient random number for data element X. Data distribution 822 may distribute data element X to a server, shown at 824, based on the random number. A live streaming of data element X, shown at 826, may be executed from the server.

Thus, an intelligent, dynamic, secure, real-time, symmetrical data streaming apparatus leveraging quantum computing is provided. Persons skilled in the art will appreciate that the present invention can be practiced by other than the described embodiments, which are presented for purposes of illustration rather than of limitation. The present invention is limited only by the claims that follow.

What is claimed is:

1. A method for dynamic, secure, real-time symmetrical data streaming leveraging quantum computing, the method comprising:
   receiving a request, from a requestor, at a streaming location, the request requesting streaming of a data element;
   identifying that the requested data element is not available within the streaming location;
   in response to the request, streaming the data element from a source location to the streaming location, said source location that is different from the streaming location;
   at the streaming location, forwarding the data element to an identification and routing location within the streaming location;
   forwarding the data element from the identification and routing location to a schema-agnostic, horizontally-scalable database for storage, said database located within the streaming location;
   storing a set of identifying details relating to the data element at a container that communicates between the identification and routing location and the database;
   concurrently to the forwarding the data element from the identification and routing location to the database for storage, forwarding the data element to a K-nearest neighbor ("KNN") calculation location, said KNN calculation location located within the streaming location;
   determining a K-value for the data element at the KNN calculation location, the K-value identifying the data element;
   maintaining the K-value at a K-value history component;
   upon determining the K-value for the data element, forwarding the data element to a quantum random number generation location, said quantum random number generation location being located within the streaming location;
   executing, at the quantum random number generation location, a quantum random number generation algorithm on the data element, said algorithm generating a quantum-resilient random number, the quantum-resilient random number that uniquely identifies the data element with respect to other data elements stored in a group of servers;
   forwarding a copy of the data element and the quantum-resilient random number to a data distribution location, said data distribution location located within the streaming location;
   identifying a server, within a group of servers, that is compatible with the data element;
   forwarding the data element and the quantum-resilient random number from the data distribution location to the identified server;
   streaming the data element from the identified server to the requestor.

2. The method of claim 1, further comprising:
   storing the data element at the identified server for a first predetermined time period, said first predetermined time period starting from when the data element is received at the identified server;
   storing the data element at KNN calculation location for a second predetermined time period, said second predetermined time period starting from when the data element is received at the KNN calculation location;
   receiving, from a second requestor, a second request at the streaming location, the request requesting streaming of the data element;
   identifying, via the K-value history component, that the requested data element is available at the server; and
   streaming the requested data element from the server to the second requestor.

3. The method of claim 1, further comprising:
   storing the data element at the identified server for a first predetermined time period, said first predetermined time period starting from when the data element is received at the identified server;
   storing the data element at the KNN calculation location for a second predetermined time period, said second predetermined time period starting from when the data element is received at the KNN calculation location;
   receiving, from a second requestor, a second request, at the streaming location, the request requesting streaming of the data element;
   identifying, via the K-value history component, that the requested data element is available not available within the group of servers;
   identifying, via the container, that the requested data element is available at the database;
   extracting the data element from the database to the KNN calculation location;
   determining a K-value for the data element at the KNN calculation location;
   maintaining the K-value at the K-value history component;
   upon determining the K-value for the data element, forwarding the data element to the quantum random number generation location;
   executing, at the quantum random number generation location, the quantum random number generation algorithm on the data element, said algorithm generating a second quantum-resilient random number, the second quantum-resilient random number that uniquely identifies the data element with respect to the other data elements stored in the group of servers;
   forwarding the data element and the second quantum-resilient random number to a data distribution location, said data distribution location located within the streaming location;
   identifying a second server, within the group of servers, that is scheduled to receive the data element;
   forwarding the data element and the second quantum-resilient random number from the data distribution location to the second server;
   streaming the data element from the second server to the second requestor.

4. The method of claim 2, wherein the first predetermined time period is twenty minutes.

5. The method of claim 2, wherein the second predetermined time period is twenty-four hours.

6. The method of claim 1, wherein the schema-agnostic, horizontally-scalable database is a NoSQL database.

7. The method of claim 1, wherein the distribution of received data elements between the group of servers is an even distribution.

8. The method of claim 1, wherein:
the quantum-resilient random number is selected from a predetermined number list;
each server, included in the group of servers, is assigned a range of numbers from the predetermined number list; and
the server is identified as compatible with the data element based on a match between the quantum-resilient random number and the range of numbers.

9. A system for dynamic, secure, real-time, symmetrical data streaming leveraging quantum computing, the system comprising:
an initial identifier and router, said initial identifier and router operable to:
receive one or more data streaming requests from a plurality of users;
execute the one or more data streaming requests; and
forward a plurality of streamed data elements, identified in the one or more data streaming requests, to one or more storage locations for future retrieval;
a mid-term storage database, said mid-term storage database operable to:
store a copy of the streamed data elements for a first predetermined time period;
a first communication element that communicates between the mid-term storage database and the initial identifier and router, said first communication element that is operable to:
maintain an index of the copy of the streamed data elements stored in the mid-term storage database;
a k-nearest neighbor number identification component, said k-nearest neighbor number identification component is operable to:
receive the streamed data elements from the initial identifier and router; and
identify a k-value for each streamed data element;
a second communication element that communicates between the k-nearest neighbor number identification component and the initial identifier and router, said second communication element operable to:
maintain a second index of the streamed data elements included in a group of servers, the second index being based on the k-value;
a quantum random number generation component, said quantum random number generation component operable to:
receive the streamed data elements from the k-nearest neighbor number identification component;
generate a quantum-resilient random number for each data element included in the plurality of streamed data elements;
tags each data element with the generated quantum-resilient random number; and
forward each of the plurality of streamed data elements tagged with the quantum-resilient random number to a data distribution processor;
the data distribution processor, said data distribution processor operable to:
distribute the streamed data elements to a short-term storage server included in the group of servers;
the short-term storage server, said server operable to:
store the streamed data elements for a second predetermined time period; and
stream the data elements to the plurality of users.

10. The system of claim 9, wherein the first predetermined time period is longer than the second predetermined time period.

11. The system of claim 9, wherein the first predetermined time period is twenty-four hours.

12. The system of claim 9, wherein the second predetermined time period is twenty minutes.

13. The system of claim 9, wherein the mid-term storage database deletes the copy of the streamed data elements after a lapse of the first predetermined time period.

14. The system of claim 9, wherein the short-term storage server deletes the stored streamed data elements after a lapse of the second predetermined time period.

15. The system of claim 9, wherein the execution of the one or more data streaming requests includes retrieval of one or more data elements, included in the one or more data streaming requests, from one or more source locations.

16. The system of claim 9, wherein, prior to the execution of the one or more data streaming requests, the initial identifier and router:
identifies, via the second communication element, that a requested data element, identified in the one or more data streaming requests, is included in the short-term storage server; and
streams the requested data element, from the short-term storage server, to one of the plurality of users.

17. The system of claim 15, wherein, prior to the execution of the one or more data streaming requests, the initial identifier and router:
identifies, via the second communication element, that a requested data element, identified in the one or more data streaming requests, is not included in the short-term storage server; and
identifies, via the first communication element, that the requested data element is included in the mid-term storage database;
retrieves the requested data element from the mid-term storage database; and
forwards the requested data element to the k-nearest neighbor number identification component.

18. The system of claim 17, wherein:
the k-nearest neighbor number identification component identifies a k-value for the requested data element;
the quantum random number generation component:
receives the requested data element from the k-nearest neighbor number identification component;
generates a second quantum-resilient random number for the requested data element;
tags the requested data element with the second quantum-resilient random number; and
forwards the requested data element tagged with the second quantum-resilient random number to the data distribution processor;
the data distribution processor distributes the requested data element to the short-term storage server, included in the group of servers, the short-term storage server being selected from the group of servers based on the second quantum-resilient random number;
the short-term storage server is operable to:
store the requested data element for a third predetermined time period; and
stream the requested data element to one or more users.

19. The system of claim 9, wherein the data distribution processor distributes each data element, included in the plurality of streamed data elements, to the short-term storage server based on the generated quantum-resilient random number, where the short-term storage server is assigned a predetermined range of numbers and the quantum-resilient random number is included within the predetermined range of numbers.

20. The system of claim 9, wherein the data distribution processor distributes each data element, included in the plurality of streamed data elements, to the short-term storage server and one or more servers included in the group of servers based on each generated quantum-resilient random numbers, where each of the group of servers is assigned a predetermined range of numbers and the quantum-resilient random number is included within the predetermined range of numbers.

* * * * *